United States Patent [19]

Trimm et al.

[11] Patent Number: 4,792,349
[45] Date of Patent: Dec. 20, 1988

[54] FERTILIZER VALUES FROM GALVANIZER WASTE

[75] Inventors: Joe R. Trimm, Killen; Louis A. Stumpe, Florence, both of Ala.

[73] Assignee: Tennessee Valley Authority, Muscle Shoals, Ala.

[21] Appl. No.: 116,190

[22] Filed: Nov. 3, 1987

[51] Int. Cl.$^4$ ............................................. C05D 9/00
[52] U.S. Cl. .......................................... 71/31; 71/25; 71/42; 71/43; 71/64.01; 71/64.1; 71/901; 423/DIG. 2
[58] Field of Search .................... 71/25, 31, 37, 42, 43, 71/64.01, 64.1, 64.13, 601; 423/DIG. 1, DIG. 2

[56] References Cited

U.S. PATENT DOCUMENTS

| | | | |
|---|---|---|---|
| 2,741,876 | 4/1956 | Paolini | 71/31 |
| 3,232,738 | 2/1966 | Bahme | 71/25 |
| 3,871,859 | 3/1975 | Jackson | 71/31 |

FOREIGN PATENT DOCUMENTS

| | | | |
|---|---|---|---|
| 0090087 | 6/1982 | Japan | 71/31 |
| 1117186 | 6/1986 | Japan | 71/31 |

Primary Examiner—Ferris H. Lander
Attorney, Agent, or Firm—Robert A. Petrusek

[57] ABSTRACT

The present invention teaches a technique and provides for apparatus eminently useful for the econimic recovery of Fe, Zn, and S from waste galvinizer sulfuric acid and crystals of iron sulfate and zinc sulfate. The technique or method of the instant invention involves the ammoniation of the acid or a solution prepared from such crystals followed by the partial oxidation of the resulting ammoniated suspension to a point where the desired product magnetite is formed in the separated from a marketable solution of ammoniacal zinc sulfate. The effecting of the instant technique requires only a minimal amount of relatively inexpensive equipment and is simply and easily placed into practice by, for example, sparging anhydrous ammonia into a stirred tank of waste acid until the Ph is elevated to about 10. Air can be sparged through the resulting slurry to oxidize the iron in the acid. After a proper incubation period, the desired stable product, e.g., magnetite is desired, which product can thereafter be recovered in a gravity-type separator with the aid of magnetic flux enhancement. Both the heretofore mentioned solid product, magnetite, and liquid product of ammoniacal zinc sulfate are readily marketable items.

17 Claims, 4 Drawing Sheets

Effect Of Time On Degree Of Conversion @ Various pH's

FERTILIZER VALUES FROM GALVANIZER WASTE

INTRODUCTION

The present invention relates to a new, novel, and relatively simple, inexpensive as well as a highly efficient method for the separation of iron as magnetite from a solution containing iron and zinc as the sulfate, particularly as in the case of waste galvanizer sulfuric acid.

The annual production of spent or waste sulfuric acid and impure crystals of iron and zinc sulfate is in excess of 100,000 tons. Disposal costs for such materials are high. In addition, disposal of same to waste represents the loss of the potentially valuable plant nutrients iron, zinc and sulfur. In order to obtain a marketable product from such otherwise waste product, the process, therefore, must facilitate a relatively clean separation of the iron and zinc as well as yield a product not classified as toxic or hazardous by standards established pursuant to guidelines promulgated by The Environmental Protection Agency (EPA). This is accomplished in the practice of the present invention by ammoniation of such waste materials to a pH preferably of about 10, subsequently oxidizing same and thereafter incubating the resulting oxidized material until the formation of magnetite therein is optimized. Once a critical portion of the iron has been converted to magnetite, its separation in such converted form from the solution of ammoniacal zinc sulfate can be readily accomplished.

BACKGROUND OF THE INVENTION

1. Field of the Invention

The present invention relates to methods and means for the extraction of iron from by-product, impure sulfuric acid and/or certain solutions prepared from crystals of iron sulfate and zinc sulfate. The instant process results in the production of a solid product consisting primarily of magnetite and a liquid product comprised of ammoniacal zinc sulfate. The elements contained in the products are among a plethora of plant nutrients normally found in both solid and fluid fertilizers.

Agronomists have classed N, P, and K as primary plant nutrients, Ca, Mg, and S as secondary plant nutrients and Zn, B, Co, Fe, Mn Cu, Na and Mo as micronutrients. Whereas the need for the primary nutrients has been known for decades, the acute need for micronutrients has become apparent only in recent years. Land, in many cases, which has been farmed for relatively long periods of time and fertilized properly with the primary nutrients N, P, and K, has become deficient in some of both the secondary nutrients and micronutrients thereby resulting in low crop yields. In order to restore optimum yields, the level of these nutrients must be brought up to acceptable levels by the addition of the deficient nutrients. (Mortvedt, J. J. et al., "Micronutrients in Agriculture" proceedings of a TVA-sponsored symposium held at Muscle Shoals, Ala., Apr. 20–22, 1971).

1. Description of the Prior Art

Waste acids and sludges have historically been discarded because of the high cost of recovering individual elements therefrom for reuse or sale. However, with the onset of regulations by the EPA in recent years, disposal costs of such materials have risen drastically.

Little work has been done on the recovery of metals or sulfur from galvanizing wastes. Work which has been performed along these lines (Twidwell, L. G. et al, "Recovery of Metal Values from Metal Finishing Hydroxide Sludges by Phosphate Precipitation," proceedings of the Twelfth Annual Research Symposium, Cincinnati, Ohio, Apr. 21–23, 1986) involved the use of relatively dilute solutions, thus making its application to concentrated waste acid unsuccessful. Indeed, in some of our earlier work in which we made attempts, similar to that of Twidwell supra, at phosphate separation of iron, the products resulting therefrom throughout the pH range of 4 to 12 were in the form of gelatinous materials. Oxidation and/or separation of iron or zinc from this material was unsuccessful in all tests using galvanizer acid or solutions prepared from waste crystals due to the formation of such gelatinous materials.

The combination of the nutrients N, S, and Zn is commonly found in a vast number of fluid fertilizers presently being produced on a commercial basis. In order to be used for this purpose, however, the feedstock materials which are to be added for the formulation thereof must be completely solubilized and must not contain materials which would cause precipitation to occur in the final product. For example, a solution of N, S and Zn containing significant amounts of Fe would be undesirable because it is known that the Fe therein would cause solid iron phosphate to form upon its addition to materials containing the primary nutrient phosphorus. For proper utilization as a feedstock in the preparation of dry fertilizers, such material must be compatible with one of the two following types of production processes: (1) for "bulk blends" or "dry mixed" fertilizers, the feedstock material must be granulated to a particle size similar to the material to which it is added (Hoffmeister, George, "Quality Control in a Bulk Blending Plant," Proceedings of the TVA Fertilizer Bulk Blending Conference, Louisville, Ky., Aug. 1–2, 1973); consequently, when materials of the same particle size are used, there will be no physical separation of the ingredients in the blend, and (2) for the production of "compound," "complex," or "cogranulated" fertilizers, the physical properties of the additives are not nearly as important and the feedstock materials may be in the form of a solution, a slurry, or a dry mix comprising relatively small-sized particles. In the manufacture of these type (2) fertilizers, all ingredients are mixed prior to granulation, thus resulting in the production of a fertilizer in which each granule contains, usually homogeneously distributed therethrough, the proportional amount of each separate ingredient comprising the fertilizer.

It will be appreciated by those skilled in this art that many of the limitations and disadvantages associated with endeavors of prior art investigators are now overcome by the practice of the instant invention in which the liquid product resulting therefrom is suitable for direct agricultural application, for mixing into fluid fertilizers, for feeding to a cogranulation fertilizer unit, or for evaporation and granulation to a particle size suitable for bulk blending and in which the solids containing fraction, i.e., the undried magnetite is in a form which can easily be granulated during a subsequent drying step for later addition to a bulk blend fertilizer or can be used wet as a feedstock for a cogranulation produced fertilizer.

SUMMARY OF THE INVENTION

The instant invention relates to a vastly improved technique, including methods and means, whereby waste acid and/or a solution prepared for certain waste crystals is converted to a fluid fertilizer containing N, S, and Zn and a solid fertilizer containing Fe, Zn, N, and S. The present invention, as will be apparent from a reading of the description infra, employs a method by which waste acid or a solution of certain waste crystals is processed to yield usable fertilizer products. In the practice of the instant invention the waste products are ammoniated with aqueous or anhydrous ammonia to a pH preferably of about 10 and subsequently oxidized with air or oxygen to convert a predetermined portion of the $Fe^{++}$ to $Fe^{+++}$. As will be appreciated from the more detailed description of the instant invention infra, the portion of the $Fe^{++}$ that is converted to $Fe^{+++}$ is highly critical and of the utmost importance in the practice of the instant invention. The slurry resulting from the practice of the instant invention is then separated by filtration, centrifugation, or preferably by setting into a liquid and a solids containing portion. The liquid portion contains about 90 percent of the Zn and S that was originally present in the starting material as well as about 90 percent of the ammonia added to the process for the purpose of neutralization and ammoniation. The solids containing portion contains essentially 100 percent of the Fe and about 10 percent of both the Zn and S values that were present in the starting material as well as about 10 percent of the ammonia added to the process for the purpose of neutralization and ammoniation.

We have found that in the practice of the instant invention that the liquid product resulting therefrom is clear and normally contains in the range from about 1 percent to about 5 percent Zn, from about 4 percent to about 10 percent N and from about 5 percent to about 10 percent S. Said liquid product is in a form suitable for direct agricultural application, for blending with liquid or fluid fertilizers, or for addition to granulation processes for the production of dry fertilizers. The solids containing product resulting from the practice of the instant invention is comprised primarily of iron oxide, present particularly as magnetite ($FeO \cdot Fe_2O_3$) and contains in amounts ranging from about 40 percent to about 55 percent Fe. Said solid product also contains residual amounts of the sulfates of iron, zinc and ammonia. We have determined that this solid product resulting from the practice of our invention is suitable for direct agricultural application, as either an additive for "cogranulation" into a fertilizer, or as a granulated product for addition to "bulk blend" fertilizer.

OBJECTS OF THE INVENTION

It is therefore the principal object of the present invention to develop a new method and/or means for easily, efficiently, and economically utilizing the fertilizer values of Fe, Zn, and S contained in waste material resulting from commercial operations for galvanizing iron, as for example, sheet stock, and converting such waste material into solid and liquid fertilizers eminently suitable for either direct application or as intermediates for subsequent blending with other materials into a variety of fertilizer products.

Another object of the present invention is to develop a new method and/or means for easily, efficiently, and economically utilizing the fertilizer values of Fe, Zn, and S contained in waste material resulting from commercial operations for galvanizing iron, as for example, sheet stock, and converting such waste material into solid and liquid fertilizers eminently suitable for either direct application or as intermediates for subsequent blending with other materials into a variety of fertilizer products and more particularly by, and of great significance to, the galvanizing industry is the provision for the utilization of these waste materials by the instant process as a viable alternative to paying more than $600 per ton for disposal of same as waste.

Still further and more general objects and advantages of the present invention will appear from the more detailed description set forth below, it being understood, however, that this more detailed description is given by way of illustration and explanation only and not necessarily by way of limitation, since various changes therein may be made by those skilled in the art without departing from the true scope and spirit of the instant invention.

GENERAL DESCRIPTION OF THE DRAWINGS

The present invention will be better understood from a consideration of the following description taken in connection with the following drawings in which.

Figure 2:
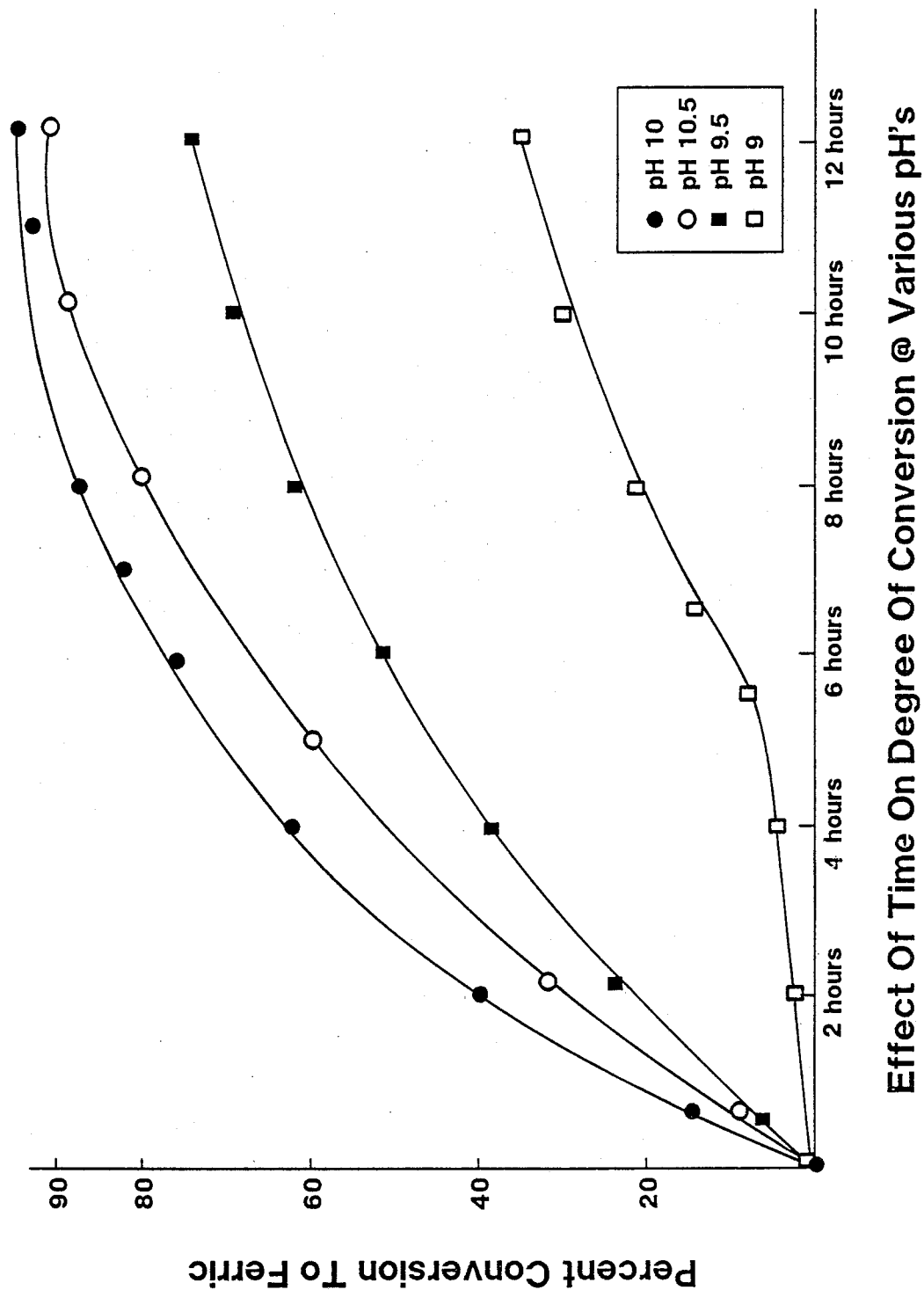
FIG. 2 is a graphical illustration of the oxidation rates at various pH values at the near pH 10 which is the preferred pH for the practice of the instant process.
Figure 3:
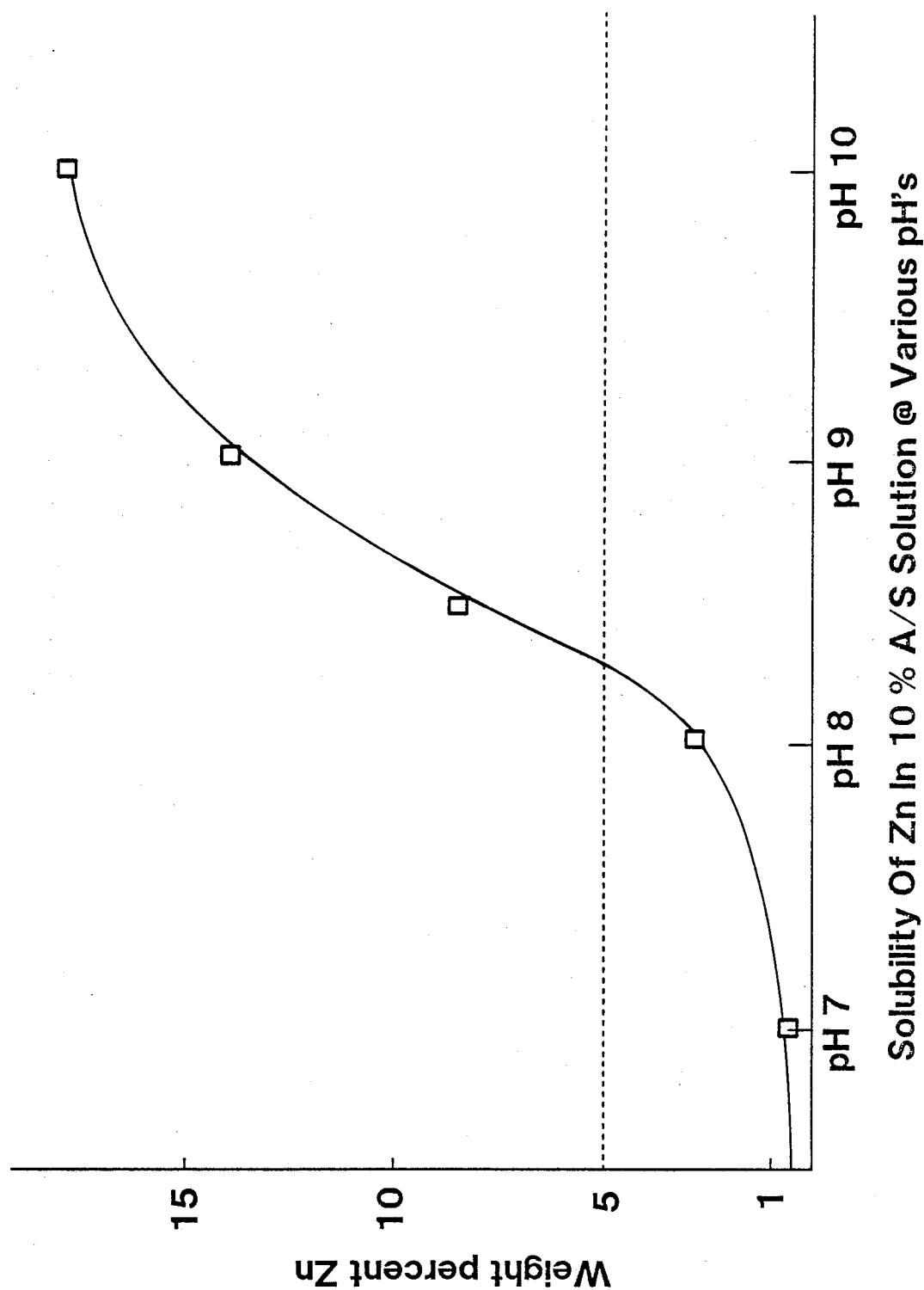
FIG. 3 is a graphical illustration demonstrating the solubility of zinc at various pH values in a simulated liquid product.
Figure 4:
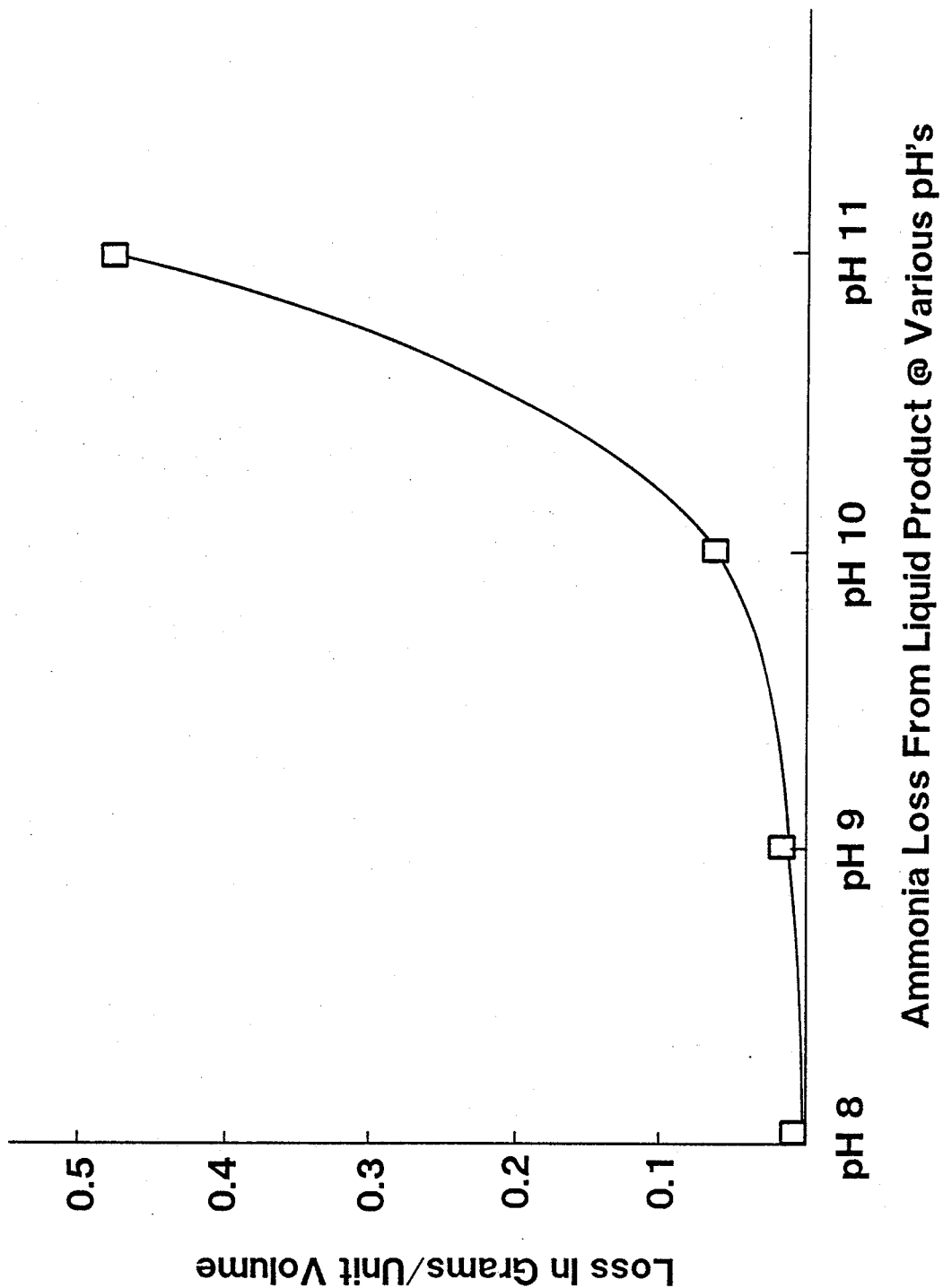
FIG. 4 is a graphical illustration of the loss of gaseous ammonia from a simulated liquid product over a pH range of 8 to 11, i.e., including the preferred pH value of 10 for the practice of the instant process.

FIGS. 2, 3, and 4 are given generally for the purpose of demonstrating the choice of a pH range for the practice of our new and novel process. For purposes of facilitating a greater understanding of the various parameters affecting the practice of the instant invention a more detailed explanation of FIGS. 2, 3, and 4 and the significance of data accompanying same is given in Examples VIII, IX, and X respectively, infra.

DETAILED DESCRIPTION OF THE DRAWINGS

Figure 1:
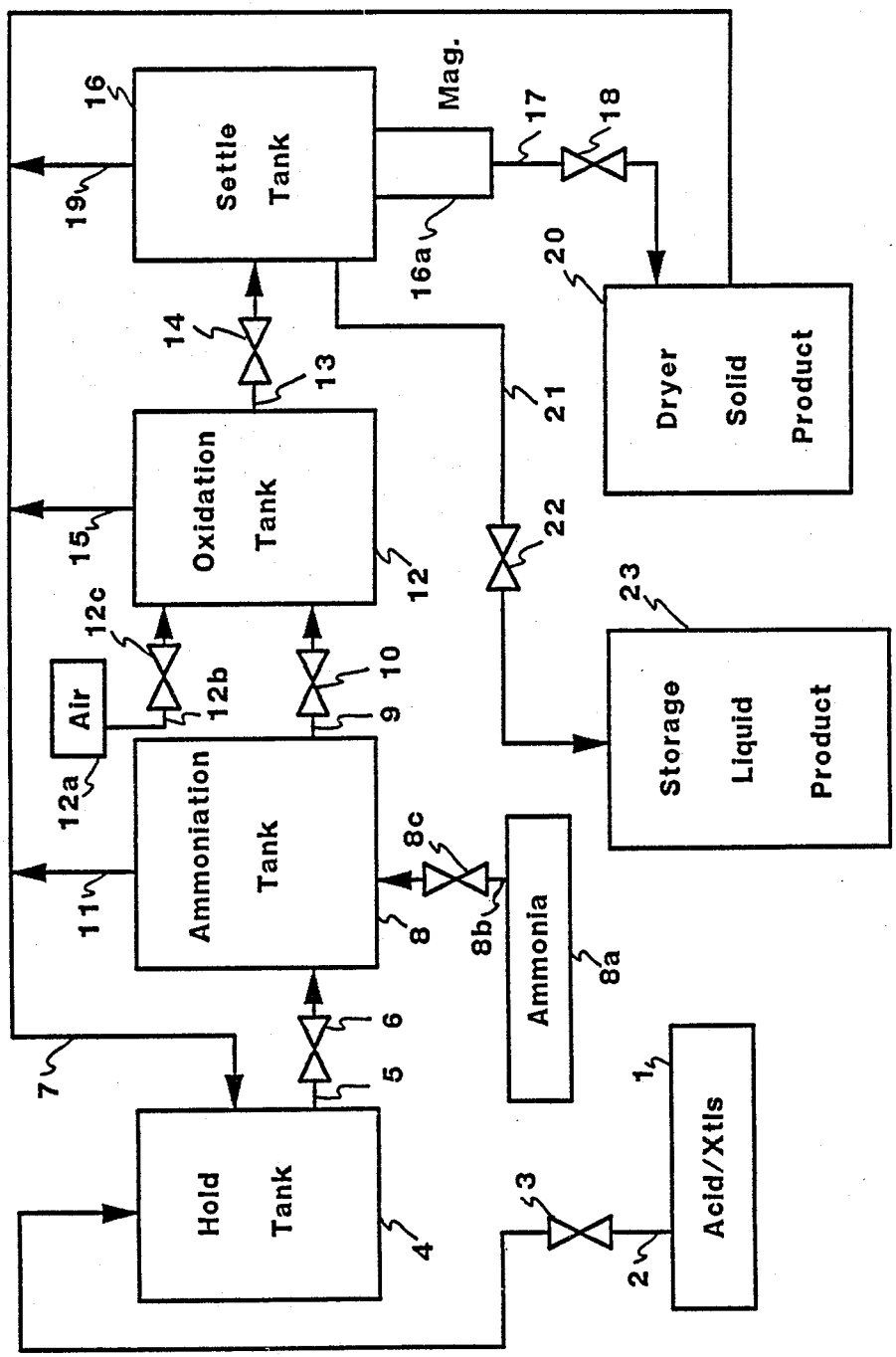
FIG. 1 is a flowsheet of the preferred arrangement generally illustrating the principles of our new and novel process.

As noted above, FIGS. 2-4 are discussed in greater detail in conjunction with Examples VIII, IX, and X infra, respectively. Accordingly, our detailed description will be directed below only to FIG. 1. Referring now specifically to FIG. I, waste acid or a solution prepared from waste crystals is removed from source 1 via line 2 and means for control of flow 3 and introduced into hold tank 4 wherein it may be stored temporarily until it is desired to begin operation of the instant process. Source 1 may be a permanent storage tank or may represent the output of a commercial galvanizing operation wherein such waste material is a by-product therefrom. At least a portion of the material in hold tank 4 is transferred via line 5 and means of control of flow 6 into ammoniation tank 8 wherein it is combined with ammonia source which, as illustrated, is retrieved from 8a and fed to ammoniation tank 8 via line line 8b and means for control of flow 8c. The material fed via lines 5 and 8b into ammoniation tank 8 are subjected to agitation by means not shown and the proportion of ammonia added thereto is predetermined to be sufficient to raise the pH of the resulting slurry therein to about 10. Off gases from ammoniation tank 8, including some ammonia, are fed via line 11 to join with line 7 for return to hold tank 4. Depending on whether the operation is carried out in batch, semibatch, or continuous operation, at least a portion of the resulting slurry in ammoniation tank 8 is removed therefrom via line 9 and means for control of flow 10 and introduced into oxidation tank 12 wherein the material so introduced therein is combined with an oxygen supply, generally shown for purpose of illustration, as air source 12a, fed to oxidation tank 12 via line 12b and means for control of flow 12c. In oxidation tank 12, air or oxygen is bubbled through the slurry maintained therein or alternatively oxygen is maintained at the surface of said slurry until oxidation of $Fe^{++}$ to $Fe^{+++}$ is about 70 percent complete as determined by $K_2Cr_2O_7$ titration for total Fe and $Fe^{++}$. After about 70 percent of the ferrous iron in oxidation tank 12 has been converted to the ferric state, at least a portion of the slurry is removed from tank 12 via line 13 and means for control of flow 14 and introduced into separating means which can be in the form of a centrifuge, a conventional filtering arrangement, or as shown herein, settling tank 16. As may be appreciated by those skilled in this art, the magnetite form of iron in settling tank 16 separates and collects at the bottom thereof. We have found that a magnet of high flux density, generally illustrated as 16a, can be used to cause a more effective and efficient solids/liquid separation whereby the resulting wet semisolid material collected by means of magnet 16a is removed from the bottom of settling tank 16 via line 17 and means for control of flow 18 and thereafter introduced into dryer 20 wherein said semisolid wet material can be dried preferably within the range of 50° C. to about 80° C. to effect the yielding of a product containing less than about 10 percent water. Said heating step would, of course, be performed after dryer 20 is charged with a load of said semisolid wet material, or concurrently, therewith, if the process is being operated on a continuous basis. The liquids containing portion of the material introduced and held in settling tank 16 may be removed therefrom via line 21 and means for control of flow 22 and introduced into storage means 23 wherefrom is collected the liquid product of the instant invention. As in the off-gassing of ammoniation tank 8 via line 11 joining with line 7, the off-gases from oxidation tank 12 and settling tank 16 are removed via lines 15 and 19, respectively, and joined with the off-gas from dryer 20 via line 7 for introduction into hold tank 4 wherein, for purpose of removing ammonia therefrom, the resulting mixture of effluent gases are scrubbed through the acid incoming thereto via line 2. In an alternative to the scheme described just supra, the wet semisolid product collected by means of magnet 16a and transferred via line 17 and means for control of flow 18 to dryer 20, may be used directly as a pumpable semisolid fertilizer without the requirement of subjecting such material to the elevated temperature of about 65° C. to reduce the water content thereof down to about 10 percent.

DESCRIPTION OF THE PREFERRED EMBODIMENTS

In determining the operating parameters allowable and desirable for practice of the present invention for treatment of waste and waste crystals we have found that our method can be operated over a rather wide range of variables. For instance, we have effectively utilized waste acid in our process which had Zn concentrations ranging from about 2 percent to about 6 percent and Fe concentrations ranging from about 1 percent to about 3 percent. Likewise, feedstock solutions produced from waste crystals have ranged from about 9 percent to about 13 percent Fe and from about 2 percent to about 7 percent Zn. We have found, that in the practice of the instant invention, ammoniation of the waste acid or the solution made from waste crystals is rapid and can be accomplished with the use of either aqueous or anhydrous ammonia; however, we prefer to use anhydrous ammonia for the ammoniation of such waste acid because there is no resulting dilution of the final product. We have determined that, in the best mode operation of our process the optimum pH is about 10, since in the operation thereof below a pH of about 10 the oxidation of $Fe^{++}$ to $Fe^{+++}$ has been observed to be considerably slower and redissolution of the Zn is not as complete. Operation thereof at a pH above about 10 results in excessive vaporization of ammonia from the products.

We have determined that during the ammoniation step of our process the following reactions are likely to occur:

Anhydrous ammonia reacts with water to form aqueous ammonia according to equation (1):

(1) 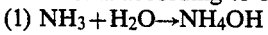 $NH_3 + H_2O \rightarrow NH_4OH$

Sulfuric acid is neutralized with ammonia according to equation (2):

(2) 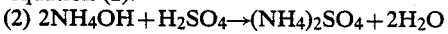 $2NH_4OH + H_2SO_4 \rightarrow (NH_4)_2SO_4 + 2H_2O$

Zn is precipitated as zinc hydroxide at near neutral pH (equation 3), then redissolves at higher pH due to the formation of a Zn—$NH_3$ complex (equation 4):

(3) 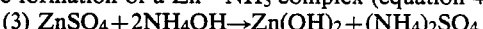 $ZnSO_4 + 2NH_4OH \rightarrow Zn(OH)_2 + (NH_4)_2SO_4$
(4) 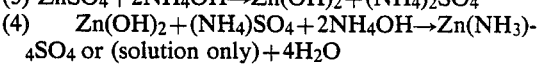 $Zn(OH)_2 + (NH_4)SO_4 + 2NH_4OH \rightarrow Zn(NH_3)_4SO_4$ or (solution only) $+ 4H_2O$ Fe is precipitated as ferrous hydroxide according to equation (5):

(5) 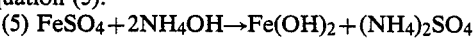 $FeSO_4 + 2NH_4OH \rightarrow Fe(OH)_2 + (NH_4)_2SO_4$

Sufficient water is added to the waste crystals to dissolve same and maintain a resulting slurry during the subsequent ammoniation and oxidation steps. In our investigations, we determined that the amount of water required to form and maintain such a slurry ranged from about 50 percent to about 75 percent of the weight of said crystals.

During the practice of the step of ammoniating the waste acid the temperature of the resulting material rises to about 80° C. due to the heat of reaction realized by combining the ammonia with the sulfuric acid values therein. The temperature is maintained at this level during the entire process. In that embodiment of the instant utilizing, as feedstock thereto solutions of waste crystals, heat must be added to reach this temperature level. After completion of our ammoniation step, the $Fe^{++}$ in the slurry is oxidized to $Fe^{+++}$ by a variety of methods; oxidation can be accomplished by sparging air or $O_2$ through the ammoniated slurry or by maintaining $O_2$ at the surface at various pressures. We have found that the lack of a resulting effluent gas from $O_2$ oxidation makes this embodiment the more desirable option. As still further advantage of practicing our invention by means of performing the oxidation with $O_2$ is that this step can thereby performed in only about 10 percent to about 20 percent of the time (depending upon $O_2$ pressure) as it is when air is used as the oxidation medium. It has been noted that as $O_2$ pressure was increased from about atmospheric to about 10 lbs/in$^2$ gauge (psig) that the rate of oxidation was increased. Due to equipment limitations, 10 psig pressure was the highest pressure used in our tests; however, in commercial application and operation of the instant process we would expect higher pressures of, say at least 50 psig and perhaps 100 psig, to be utilized with resulting still further increases in oxidation rates. The oxidation of $Fe^{++}$ to $Fe^{+++}$ is followed by the spontaneous decomposition of ferric hydroxide, $FeO(OH)$, to ferric oxide ($Fe_2O_3$). Equations (6) and (7) infra, illustrate these reactions.

(6) $4Fe(OH)_2 + O_2 \rightarrow 4FeO(OH) + H_2O$ (7) $2FeO(OH) \rightarrow Fe_2O_3 + H_2O$ An important feature, and indeed critical parameter of the instant invention is directly related to our discovery that if the oxidation step is terminated when about 70 percent of the $Fe^{++}$ is oxidized then the $Fe_2O_3$ will react with the unoxidized $Fe(OH)_2$ according to equation (8):

(8) $Fe_2O_3 + Fe(OH)_2 \rightarrow Fe_2O_3.FeO$ (magnetite) $+ H_2O$

After the desired level of oxidation is reached, the slurry is stirred for a substantial period of time to provide for the formation of magnetite. We have found that in the best mode operation of our process, this time period for stirring should be at least about 2 hours.

Separation of the slurry into a solids containing portion and a liquid portion can be accomplished by centrifugation, filtration, or settling. For instance, we have found that the slurry can be centrifuged for about 5 minutes in a 2-inch diameter tube in a 5-inch diameter centrifuge at 3,000 revolutions per minute (resulting in about 1000 G's force applied thereto) to effect at least about 90 percent of the liquid therein being separated therefrom. We have also found that employing filtration rates that are moderate using, for instance, vacuum filtration systems, i.e., from about 450 mm to about 500 mm of vacuum and effective filtering rates ranging from about 1 to about 3 liters/meter/minute result in about 90 percent of the liquid being separated. As may be expected the use of settling takes significantly more time, i.e., about 24 hours results in a separation yielding only about 75 percent clear solution. We have also discovered that due to the magnetic properties of magnetite, a strong magnet placed at or near the bottom of the settling container results in a dramatic increase in settling rates. For example, the settling rate for a column of slurry 10 cm high was such as to yield a 75 percent clear solution in 24 hours but was increased to 85 percent clear solution in about 2 minutes with the aid of a magnet with a field strength in the region of said column of about 1400 gauss. The particular setup used in our early tests employed a generally semicircular-shaped permanent magnet, obtained from a dismantled motor assembly. We used only one pole thereof for juxtapositioning with the collecting area. Accordingly, a straight bar type magnet would have worked equally well. From our research as well as from our contacts with suppliers of magnetic-type separation equipment it has been concluded that the effective flux of such magnet should be at least about 1000 gauss. Although an upper effective flux of about 20,000 gauss can be realized by use of an electromagnet, it has been concluded that for all practical purposes, the maxima usable densities are about 2000 gauss and about 10,000 gauss for permanent and electromagnets, respectively.

The liquid product, resulting therefrom, is quite stable and can therefore be stored for substantial periods of time, i.e., for as long as about 12 months. Although a small amount of iron oxide may form in the liquid product as traces of soluble $Fe^{++}$ slowly oxidize to insoluble $Fe_2O_3$, we have found no problems are presented thereby. The solid product containing residual Zn, S, and N can be used in the semisolid state or it may be dried. Drying at a temperature of about 60° C. and for a period of time of about 1 hour, resulted in adequate drying of a 100 g sample 1 cm thick. The observed drying rate for samples of the semisolid which were about one centimeter in thickness is given in Table I below. It is noted that a graphical illustration or plot of this data would approximate a second order curve.

TABLE I

| Time (hours) | % $H_2O$ remaining in samples after various drying times | | | | |
|---|---|---|---|---|---|
| | 0 | ½ | 1 | 2 | 3 |
| % $H_2O$ | 71.6 | 28.0 | 14.7 | 3.6 | 3.6 |

We have found in the practice of our process, that if oxidation is continued beyond about 70 percent, a portion of the magnetite is oxidized according to equation (9) to yield ferric oxide.

(9) $2FeO.Fe_2O_3 + O \rightarrow 3Fe_2O_3$

This formation of ferric oxide results in the formation of a solid with no magnetic properties and consequently slower settling rates. Filtration of a solid product containing ferric oxide is slower than a product formed under recommended conditions.

EXAMPLES

In order that those skilled in the art may better understand how the present invention can be practiced, the following examples are given by way of illustration only and not necessarily by way of limitation.

It should be understood that the Examples herein given were selected for the purpose of illustrating the new and novel process of our invention when practiced with the use of various feedstocks. A variety of feedstocks were selected to illustrate the effects of varying chemical composition of same. During the practice of the instant invention, the use of different feedstocks resulted in the two major variances in the process. (1) The amount of water needed to maintain the fluidity during the ammoniation and oxidation steps was dependent on the Fe content of the feedstock and, (2) the concentration of Zn in the liquid product was dependent on the concentration of Zn in the feedstock.

Examples I through IV below are intended to show that the process of the instant invention is applicable to a wide variety of feedstocks with all yielding marketable products. Examples I and IV illustrate the application of the process to waste galvanizer acid whereas Examples II and III illustrate the application of the process to solutions prepared from waste crystals. In all cases the desired solid product magnetite and a liquid product containing Zn, S, and N were produced all being in a physical form acceptable for agricultural use.

Examples V, VI, and VII are offered for the purpose of illustrating the critical need for the formation of magnetite.

Examples VIII and IX are offered for the purpose of illustrating the critical need for a pH adjustment of about 10 prior to oxidation of the iron.

EXAMPLE I

A 1-liter sample (1230 g) of galvanizer acid was contained in a glass cylindrical vessel about 8 cm in diameter and 40 cm high. Anhyrous ammonia was added until the pH of the resulting slurry was about 10. The ammonia was added via a solid glass tube extending to near the bottom of the vessel at a rate so to accomplish desired neutralization and ammoniation in about 10 minutes. The amount of ammonia required for the neutralization and ammoniation was about 84 g. Upon completion of the ammoniation step, the vessel was fitted with a neoprene stopper containing a glass tube extending through said stopper for the purpose of introducing oxygen. Oxygen was then introduced through said tube at a pressure of 5 psig until about 70 percent of the $Fe^{++}$ had been oxidized to $Fe^{+++}$ as determined by $K_2Cr_2O_7$ titration for total Fe and $Fe^{++}$. The time required for desired oxidation was about 50 minutes and consumed about 2.9 g of $O_2$. During the ammoniation and oxidation steps of the current example, the slurry was stirred with a magnetic stirring bar at a rate of about 30 revolutions per minute. After the desired oxidation was effected, stirring was continued for about 2 hours to allow for the formation of the magnetite. During the ammoniation step the temperature rose to about 80° C. and was maintained at this temperature during the entire process by means of a water bath surrounding the reaction vessel. A first portion of the slurry amounting to about 25 percent of the total i.e., 325 g was taken and centrifuged in a 5-inch diameter unit at a rate of 3,000 revolutions per minute resulting in about 1000 G force being applied for a period of about 5 minutes. Following the centrifugation about 88 percent of the liquid product was separated by decantation from the solids containing product. Based on analysis of the material from the 88 percent separation of liquid and solids, the disposition of values in the starting acid were as follows: About 85 percent of the Zn, about 88 percent of the S and about 0 percent of the Fe was contained in the liquid portion as well as about 84 percent of the N from the ammonia added for the purpose of neutralization and ammoniation. About 15 percent of the Zn, about 12 percent of the S and about 100 percent of the Fe were contained in the solids containing portion as well as about 16 percent of the N from the added ammonia.

A second 25 percent portion (about 325 g) of the slurry was vacuum filtered on a 9 cm diameter piece of Whatman #40 filter paper with a vacuum of about 500 mm of mercury. (NOTE: Any references made herein to processes, materials and/or apparatus which are identified by means of trademarks, trade names, etc., are included solely for the convenience of the reader and are not intended as, or to be construed, an endorsement of said processes, materials, and/or apparatus.) The vacuum filtration required about 33 minutes for about a 90 percent separation of liquid product and solids containing product.

A third portion of about 25 percent (325 g) of the slurry was placed in a cylindrical container about 5 cm in diameter and 10 cm high. With a magnet of about 1400 gauss placed at the bottom thereof, about 88 percent settling of the liquid product from the solids containing product was obtained in about 1 hour. The same slurry was shaken to suspend solids and then allowed to settle without the aid of the magnet. In this case maximum settling was obtained in about 24 hours with about 75 percent being separated as a clear liquid product. A chemical analysis was performed on the liquid product without treatment and on the solid containing liquid portions after drying about 1 cm thick portions of the solids obtained from the different separation techniques.

Once drying had been completed a chemical analysis was performed for the elements Fe, Zn, S and N. Values for all products are summarized in Table II below.

TABLE II

| Material | Element, % | | | |
|---|---|---|---|---|
| | Fe | Zn | S | N |
| Starting acid | 0.99 | 4.11 | 5.61 | 0.00 |
| Liquid product | 0.02 | 3.75 | 3.93 | 6.68 |
| Solid product (filtered) | 38.5 | 6.66 | 6.61 | 5.24 |
| Solid product (centrifuged) | 32.9 | 5.56 | 6.47 | 5.84 |
| Solid product (settled) | 24.0 | 9.68 | 7.58 | 11.7 |

Fertilizer additives with suitable chemical and physical properties were obtained using the given procedure. A small amount of Fe (0.02%) precipitated in the liquid portion after standing for 1 day due to the oxidation of soluble $Fe^{++}$ to insoluble $Fe^{+++}$. This amount of Fe was sufficient to impart a brown color to the liquid product but did not change the fluid properties significantly. The precipitated iron oxide settled to a volume of less than about 1 percent and was easily withdrawn from a conical separatory funnel and returned to the solids containing portion of the product.

EXAMPLE II

The the series of tests comprising this Example, we utilized equipment of size, shape, and other design criteria similar to that employed in Example I, supra; however, we utilized as feedstock thereto a solution of about 500 g of waste galvanizer crystals and 500 g of water. Anhydrous ammonia was added until the pH of the resulting slurry was about 10. The ammonia was added via a solid glass tube near the bottom of the vessel at a rate so as to accomplish its desired neutralization and ammoniation in about 10 minutes. Following the ammoniation step another glass tube was placed into the slurry and extended to near the bottom of the vessel for the purpose of introducing $O_2$, which was bubbled through the slurry until the desired 70 percent oxidation was accomplished. During the oxidation step, additional ammonia was added to maintain a pH of about 10. This additional ammonia was necessary due to the fact that ammonia was being lost from the system via exiting $O_2$. The time required for the desired oxidation was about 90 minutes. Stirring was done in the same manner as in Example I. The temperature of the slurry was maintained at about 70° C. throughout the test. A first portion of the slurry amounting to about 25 percent (260 g) was centrifuged as in Example I. Following the centrifugation, about 90 percent of the liquid product was decanted from the solids containing portion.

A second portion of about 25 percent of the slurry was vacuum filtered as in Example I, requiring a time of about 15 minutes and resulting in about 90 percent of the liquid being separated form the solids containing portion.

A third portion of about 25 percent was subjected to magnetically enhanced settling as in Example I resulting in about 88 percent of the clear liquid being separated from the solids containing portion in about 10 minutes. Drying of the solids containing products was performed as in Example I and determination of the elements Fe, Zn, S and N was made. Values for all products are summarized in Table III below.

TABLE III

| Material | Element, % | | | |
|---|---|---|---|---|
| | Fe | Zn | S | N |
| Starting crystals | 9.97 | 10.2 | 11.3 | 0.00 |
| Liquid product | <.01 | 3.63 | 4.17 | 5.89 |
| Solid product (filtered) | 49.1 | 7.36 | 3.53 | 2.59 |
| Solid product (centrifuged) | 46.7 | 7.68 | 4.64 | 3.92 |
| Solid product (settled) | 42.2 | 8.72 | 5.17 | 4.30 |

Fertilizer products with suitable chemical and physical properties were obtained using the procedures given.

EXAMPLE III

In the series of test comprising this Example, we utilized equipment of size, shape, and other design criteria similar to that employed in Example I, supra; however, we used as feedstock thereto a solution comprised of about 250 g of waste galvanizer crystals and 750 g of water. Neutralization, ammoniation and oxidation was performed similar to Example II shone with the exception being that air was bubbled through the slurry instead of $O_2$ for the purpose of oxidation. As expected the time for oxidation increased substantially, i.e., to about 5 hours.

A portion of the slurry comprising about 25 percent of the total slurry i.e., about 250 g, was centrifuged in a manner similar to Example I, resulting in about 90 percent separation of the liquid product from the solids containing portion.

A second portion of the slurry was filtered in a manner similar to Example I and resulted in about 92 percent of the liquid product being separated from the solids containing portion.

A third portion of the slurry comprising about 25 percent of the total was subjected to magnetically enhanced settling similar to that in Example I, resulting in about 90 percent of the liquid product being separated from the solids containing portion.

Analysis of the liquid product and dried portions of the solid products is shown in Table IV below.

TABLE IV

| Material | Element, % | | | |
|---|---|---|---|---|
| | Fe | Zn | S | N |
| Starting crystals | 13.8 | 6.06 | 11.3 | 0.00 |
| Liquid product | <.01 | 1.36 | 3.30 | 6.10 |
| Solid product (filtered) | 57.4 | 2.19 | 2.70 | 1.98 |
| Solid product (centrifuged) | 55.5 | 2.24 | 3.73 | 3.26 |
| Solid product (settled) | 53.7 | 2.36 | 3.83 | 3.37 |

The preceding experiment produced products that were determined to be suitable as fertilizer additives.

EXAMPLE IV

In the series of tests comprising this Example, we utilized equipment of size, shape and other design criteria similar to that employed in Example I, supra; however a different waste acid with different values of Fe, Zn and S was used as feedstock. All conditions of neutralization, ammoniation, oxidation, separations and drying were similar to Example I.

The centrifugation described in Example I, when applied to the products of the tests comprising the current example, resulted in a separation of about 90 percent of the liquid product being separated from the solids containing portion.

The filtration procedure described in Example I, when applied to the current example resulted in about 90 percent of the liquid product being separated from the solids containing portion.

The magnetically enhanced settling technique described in Example I, supra, when applied to the test comprising the current Example, resulted in about 85 percent of the liquid product being separated from the solids containing portion.

Analysis of materials is shown in Table V below.

TABLE V

| Material | Element, % | | | |
|---|---|---|---|---|
| | Fe | Zn | S | N |
| Starting acid | 2.80 | 5.55 | 9.34 | 0.00 |
| Liquid product | 0.09 | 4.58 | 7.93 | 10.3 |
| Solid product (filtered) | 42.0 | 4.23 | 7.76 | 5.77 |
| Solid product (centrifuged) | 42.1 | 4.76 | 7.77 | 5.85 |
| Solid product (settled) | 38.0 | 5.36 | 8.63 | 6.50 |

The preceding experiments produced products that we determined to be suitable as fertilizer additives.

It will become apparent when Examples I through IV are examined that the process of the instant invention can be applied to a variety of feedstocks, all yielding a marketable solid product of magnetite and a liquid product of zinc, sulfur, and nitrogen.

EXAMPLE V

In the series of tests comprising this Example, we utilized equipment of size, shape, and other design criteria similar to that employed in Example I, supra. Feedstock, neutralization, and ammoniation were similar to Example I, supra; however, instead of oxidizing $Fe^{++}$ to $Fe^{+++}$, i.e., the oxidation step was omitted to emphasize the critical need for conversion of the Fe to magnetite. The ammoniated slurry was subjected to the separation procedures described in Example I. Attempts at centrifuging were moderately successful yielding about a 70 percent separation of liquid product from solid containing portion. Separation of the liquid portion resulting from the centrifuging resulted in a solution containing about 1 percent Fe. Oxidation of this quantity of Fe and resulting precipitation of iron oxide rendered the solution unfit as a fertilizer additive without additional treatment. The solids portion contained considerably larger amounts of Zn (about 10 percent in the dried product) than in tests wherein the materials were oxidized. Attempts at settling were unsuccessful in that practically no separation of solids was realized due to the lack of magnetic properties.

EXAMPLE VI

In the series of tests comprising this Example, we utilized equipment of size, shape, and other design criteria similar to that employed in Example I supra. All conditions were similar to Example I except that oxidation was continued until essentially all $Fe^{++}$ had been oxidized to $Fe^{+++}$ thereby resulting in the formation of $Fe_2O_3$ instead of magnetite. Attempts at centrifuging this material were moderately successful with about 85 percent of the liquid portion being separated from the solids containing portion. Attempts at filtering the material were unsuccessful in that practically no liquid product could be separated from the slurry. Settling resulted in about 50 percent of the liquid being separated in about 24 hours. This separation rate is undesirable due to the fact that most large scale separations are made by filtration or settling.

EXAMPLE VII

In the series of tests comprising this Example, we utilized equipment of size, shape, and other design criteria similar to that employed in Example I, supra; however, we used as a feedstock thereto a different galvanizer acid. During ammoniation the pH of the resulting slurry was raised to the desired level of about 10. Before oxidation was begun a sample was withdrawn from the slurry and tested for filtration and settling properties as well as for chemical content. These same tests were performed at various levels of oxidation in order to obtain a comparative level of filtration, settling and chemical properties with respect to the oxidation level and the amount of magnetite therein, that being a direct result of the oxidation level.

Samples of the slurry were withdrawn from the oxidizing vessel at about 0, 30, 60, 70, and 100 percent oxidation of the $Fe^{++}$ to $Fe^{+++}$. The concentrations of Fe, Zn, and S were determined on portions of the slurry without treatment and on a filtered portion of the slurry, i.e., the liquid product.

During the tests a sample portion was withdrawn at specified intervals and filtration and settling rates determined as follows: A 20 mL portion of the untreated slurry was withdrawn and subjected to filtration on a 2.5 cm circle of Whatman GF/A glass fiber paper at a vacuum of about 500 mm. Settling tests were performed in a container about 2.5 cm in diameter and 10 cm in height placed over a magnet of about 1400 gauss field strength with the measurements therefrom indicating the percent of clear liquid, i.e., liquid product, that was free of solids in a period of about 10 minutes.

A portion of slurry was withdrawn immediately following ammoniation to pH 10 but before any oxidation of $Fe^{++}$ to $Fe^{+++}$. Attempts at filtering of the solid from the liquid were unsuccessful in that only a few drops of liquid were pulled through the filter paper when flow stopped completely. Settling, when performed as previously described, resulted in about 10 percent of the clear liquid being separated in the 10 minute test time period.

A portion of the slurry was withdrawn when oxidation of the $Fe^{++}$ to $Fe^{+++}$ was about 30 percent complete. The rate of filtration was about 0.2 mL per minute under the previously described conditions and the amount of settling was about 50 percent.

A portion of the slurry was withdrawn when the conversion by oxidation described supra was about 60 percent complete. The rate of filtration at this point was about 0.4 mL per minute and settling tests resulted in about 70 percent of the clear liquid being separated.

A portion of the slurry was withdrawn when the conversion by oxidation supra had reached about 65 percent. At this point the filtration rate was about 0.4 mL per minute and the settling rate was sufficient to yield about 75 percent of the slurry as a clear liquid product in the 10 minute time period.

A portion of the slurry was withdrawn when the conversion by oxidation supra had reached about 70 percent. At this point the filtration rate was about 0.5 mL per minute and the settling rate was sufficient to yield about 85 percent of the slurry as a clear liquid product in the 10 minute time period.

Portions of the slurry were withdrawn at 75 and 85 percent oxidation. Filtration rates were about 0.4 and 0.3 mL per minute, respectively. At these oxidation levels the settling rates were ambiguous. The magnetite in each sample settled at the approximate rate as in the 70 percent oxidized sample, however, as the magnetite settled a cloudy solution of the liquid product and ferric oxide resulted. The ferric oxide settled at a rate in both samples which yielded about 40 percent clear solution in 10 minutes. As the oxidation was increased above about 85 percent oxidation, the remaining magnetite and the ferric oxide did not separate and the amount of each was indistinguishable. The settling rate remained at about 40 percent in 10 minutes.

A final portion of the slurry was withdrawn when oxidation conversion had reached about 100 percent. It should be noted that the stability of the magnetite formed previously in the slurry resulted in necessary addition of hydrogen peroxide to completely oxidize the Fe to $Fe_2O_3$. The filtration of the slurry was about 0.2 mL per minute and the settling rate was about 40 percent.

The settling rates as well as the composition of the filtrate are summarized below in Tables VI and VII.

TABLE VI

| | Comparative Settling Rate at 10 Minutes | | | | | | | |
|---|---|---|---|---|---|---|---|---|
| % oxidation of $Fe^{++}$ to $Fe^{+++}$ | 0 | 30 | 60 | 65 | 70 | 75 | 80 | 100 |
| % settled cloudy solution | 10 | 50 | 75 | 75 | 85 | 85 | 85 | 40 |
| % settled clear solution | 10 | 50 | 70 | 75 | 85 | 40 | 40 | 40 |

TABLE VII

Composition of Liquid Product and Starting Acid

| | Element, % | | | |
|---|---|---|---|---|
| Material | Zn | Fe | S | N |
| Starting acid | 5.39 | 2.47 | 9.31 | 0.00 |
| Liquid product, 0% oxidation | 4.83 | 1.68 | 8.34 | 9.11 |
| Liquid product, 30% oxidation | 4.80 | 1.29 | 8.31 | 9.09 |
| Liquid product, 60% oxidation | 4.83 | 0.80 | 8.32 | 9.10 |
| Liquid product, 70% oxidation | 4.90 | 0.42 | 8.34 | 9.09 |
| Liquid product, 100% oxidation | 4.83 | 0.03 | 8.42 | 9.07 |

When the data in this Example are examined a number of facts come to light. Both insufficient conversion of $Fe^{++}$ to $Fe^{+++}$ by oxidation, or total conversion by such oxidation is undesirable because the solid products lack adequate filtration rates and, due to the absence of magnetite, have no properties which would result in rapid settling. It should be noted that, although filtration rates were somewhat increased as the percent conversion ranged from none up to about 65 it began to fall off dramatically as percent conversion ranged from 80 percent up to 100 percent. These filtration rates, which were observed for conversions outside our preferred range of between about 65 percent and about 75 percent are well below the rates which would make large-scale filtration possible. Settling, which appears at this point to be the most economical process for separating the solid and liquid fractions, was practically nonexistent at 0 percent oxidation conversion and was poor at 100 percent oxidation conversion. During this series of tests, wherein we varied the degree of conversion by oxidation and subsequent formation of magnetite, the observed settling rates increased only slightly through the range of conversion 0–65 percent, then increased dramatically through the range of about 65 percent and about 75 percent, reaching a maximum at about 70 percent oxidation conversion which corresponds to the maximum formation of the magnetite, then decreased as additional proportions of magnetite were oxidized to ferric oxide. Accordingly, we have determined that in the very best application (most preferred mode) of the instant invention, oxidation of the Fe should be maintained until it is about 70 percent complete and then terminated. We have also determined that the preferred range is slightly above 65 percent, i.e., between about 65 percent to about 75 percent conversion and more particularly, between about 67 percent and about 75 percent conversion of $Fe^{++}$ to $Fe^{+++}$. Such a procedure results in the complete formation of magnetite, which is readily separated from the liquid by magnetically enhanced settling.

EXAMPLE VIII

(IN CONJUNCTION WITH FIG. 2)

The purpose of conducting the tests comprising this Example was to determine the relative rate of oxidation of the iron at various pH values in a portion of a certain galvanizer acid. In these tests we utilized equipment of size, shape, and other design criteria similar to that employed in Example I, supra; however, a different waste acid was utilized as feedstock.

In this series of tests, the galvanizer acid was neutralized then ammoniated to various pH values where oxidation of the iron was performed at about 5 psig of oxygen.

During the course of the oxidation studies comprising this Example it became apparent that oxidation below about pH 9 was too slow to have any practical value in the practice of the process. In addition, the viscosity was high due to the slow dissolution of the Zn, resulting in a slower than expected oxidation of the Fe at about pH 9. The viscosity decreased after about 4 hours and the expected rate of oxidation was then accomplished. The rate of oxidation increased greatly when the pH was increased from about pH 9 to about pH 10, but then decreased slightly at about pH 10.5. It was not clear as the reason for this decrease. A pH value above 10.5 could not be obtained with this particular acid using anhydrous ammonia at atmospheric pressure. The oxidation rates at the various pH values are illustrated in FIG. 2.

It may be seen from the examination of the data illustrated in FIG. 2 that a pH of about 10 is most desirable in the practice of the process. At pH levels below 10, the rate of oxidation of the iron is too slow and at pH values about 10 the rate is not significantly increased.

EXAMPLE IX

(IN CONJUNCTION WITH FIG. 3)

The purpose of conducting the tests comprising this Example was to determine the solubility of Zn in a solution similar to the liquid product and to determine if the solubility at about pH 10 is sufficient to solubilize all of the Zn contained in the various feedstocks. An aqueous solution containing about 10 percent by weight of ammonium sulfate was ammoniated to and maintained at various pH levels. Zinc sulfate was added until no further dissolution of said sulfate was noted resulting in a saturated solution of Zn in said liquid product. The temperature was maintained at 25° C. and the samples stirred with a ⅜ by ¼ inch stirring bar at about 100 rounds per minute. After about 1 hour of stirring thus allowing for equilibrium in the slurry, a portion of the liquid was withdrawn and the concentration of zinc determined. FIG. 3 illustrates the solubility of Zn in said liquid product. The broken line at 5 weight percent Zn represents the minimum required concentration for agronomically attractive fertilizer products.

A concentration of 1 percent to 5 percent Zn in the liquid product is considered to be suitable for agricultural application and it can be seen that these concentrations of Zn are readily obtainable at pH levels of about 9.5 and above and are sufficiently high as to contain all of the Zn originally present in the various feedstocks.

EXAMPLE X

(IN CONJUNCTION WITH FIG. 4)

The purpose of conducting the tests comprising this Example was to determine the rate of ammonia loss from the liquid product produced when applying the process of the instant invention to galvanizer acid. A solution containing about 10 percent $(NH_4)_2SO_4$ and about 25 percent $ZnSO_4.7H_2O$, these being the approximate concentrations found in the liquid product, was ammoniated with anhydrous ammonia to various pH values. A portion of about 50 mL of each was then placed in a closed bottle about 4 cm in diameter thus resulting in a surface area of about 12.5 $cm^2$ and a depth of about 4 cm. The temperature of each was maintained at about 25° C. As ammonia was vaporized at the surface it was swept from the bottle with a stream of air amounting to about 100 mL per minute. The ammonia containing air was sparged through a solution of dilute sulfuric acid to remove said ammonia. The amount of ammonia in the sulfuric acid solution was determined and the ammonia loss from the liquid product calculated. FIG. 4 shows the ammonia loss at the various pH values.

Ammonia loss was negligible at pH values below 9 and was moderate at about pH 10. Above about pH 10.5 the ammonia loss was excessive. Products at about pH 10 and below should present no hazard to the environment or to persons in the vicinity of said product. Although the process of the instant invention can be operated successfully as high as pH 11, the resulting product has a rapid ammonia loss. This product could be utilized, however, if it is stored under pressure and diluted with water or other liquid products prior to use. Attempts at adjusting the pH of the products at pH 11 down to pH 10 with sulfuric acid resulted in the formation and precipitation of zinc ammonium sulfate.

After sifting and winnowing through the data supra, as well as other results of tests and operation of our new, novel, and improved method, we now present the acceptable and preferred parameters and variables as shown below.

| Variables | Limits | Preferred |
| --- | --- | --- |
| Temp during ammoniation (°C.) | 20–100 | 80 |
| pH during oxidation | 9.5–11 | 10.0 |
| % oxidation (conversion) of Fe to $Fe^{+++}$ | 67–75% | 70% |
| $O_2$ pressure psig | 0–100 | 10–100 |
| Time for formation of magnetite (hrs) | 0–24 | 2 |
| Time for liquid/solids separation (hr) | 0.03 | 24 |
| Temp for drying semisolid (°C.) | 20–100 | 60–80 |
| Magnetic flux density in region of magnetite collection (gauss) | 1000–10,000* | 1000–2000 |
| Zn content of feedstock | 1–10 | 5–10 |

-continued

| Variables | Limits | Preferred |
|---|---|---|
| Fe content of feedstock | 1–10 | 1–5 |
| Zn content of liquid product | 1–6% Zn | 5% |
| Fe content of liquid product | 0.001–0.1% | 0.001–0.01 |
| Fe content of solid product | 30–60 | |

*Electromagnet utilized above about 2 kilogauss.

While we have shown and described particular embodiments of our invention, modifications and variations thereof will occur to those skilled in the art. We wish it to be understood therefore that the appended claims are intended to cover such modifications and variations which are within the true spirit and scope of our invention.

What we claim as new and desire to secure by Letters of Patent of the United States is:

1. A process for winning valuable agricultural micronutrient values from hazardous materials normally derived from galvanizer waste by-products, said hazardous materials selected from the group consisting of spent sulfuric acid, iron sulfate, zinc sulfate, and mixtures thereof, and said micronutrient values comprising elemental iron and zinc, which process comprises the steps of:
   (a) securing as feedstock to said process, aqueous media comprising iron sulfate and selected from the group consisting of spent sulfuric acid containing from about 1 to about 3 percent, by weight, of Fe, and from about 2 to about 6 percent, by weight, Zn, an aqueous solution or slurry prepared from iron sulfate containing from about 1 to about 10 percent, by weight, Fe, an aqueous solution or slurry prepared from iron sulfate and zinc sulfate, said aqueous solution or slurry prepared from said iron sulfate and/or zinc sulfate containing from about 1 to about 10 percent, by weight, of Fe, and/or from about 1 to about 10 percent, by weight, Zn said amounts of Fe and Zn being essentially in dependent and inversely proportional relationship to one another, and mixtures thereof;
   (b) introducing at least a portion of said feedstock secured in step (a) supra into first reactor means;
   (c) introducing into said first reactor means ammoniating media, said ammoniating media selected from the group consisting of anhydrous ammonia, aqueous ammonia, and mixtures thereof, for a time and in predetermined quantity sufficient to raise the pH of the materials therein up to the range of from about 9 to about 11 and to result in the partial ammoniation thereof;
   (d) maintaining the temperature of the materials in said first reactor means in the range of from about 20° C. to about 100° C. during said partial ammoniation in step (c) supra;
   (e) removing at least a portion of the resulting partially ammoniated material from said first reactor means and introducing same into second reactor means;
   (f) introducing into said second reactor means oxidizing media, said oxidizing media selected from the group consisting of air, oxygen, and mixtures thereof and contacting said portion of said resulting partially ammoniated material introduced therein with said oxidizing media for a time and in quantities sufficient only to result in the conversion of from about 67 percent to about 75 percent of the total Fe in said partially ammoniated material to $Fe^{+++}$;
   (g) subsequently discontinuing the contacting of said material in said second reactor means with substantial additional quantities of said oxidizing media;
   (h) reacting autogenously, the material resulting from the contact in said second reactor means of said partially ammoniated material with said oxidizing media from step (f) supra, for a period of time sufficient to allow for the substantially complete reaction of the unoxidized ferrous hydroxide with the ferric oxide to thereby result in the formation of magnetite;
   (i) introducing at least a portion of the substantially reacted material from step (h) supra into gravity type liquid/solids containing separation means;
   (j) subjecting the material juxtaposed at least the lower region of said separation means to the influence of substantial magnetic flux to thereby enhance the gravitational separation of the magnetite therein;
   (k) removing from said separation means the liquid portion, said liquid portion containing greater than about 90 percent, by weight, of the zinc and less than about 1 percent, by weight, of the iron originally contained in said feedstock; and
   (1) removing from said separation means the solids containing portion, said solids containing portion containing greater than about 99 percent, by weight, of the iron and less than about 10 percent, by weight, of the zinc originally contained in said feedstock.

2. The process of claim 1 wherein the period of time in step (h) thereof ranges from about 0.5 hour to about 24 hours.

3. The process of claim 1 wherein said second reactor means is maintained, during at least a substantial portion of the operation of step (f) thereof, at a pressure ranging from about atmospheric to about 100 psig.

4. The process of claim 1 wherein said time and said quantities of oxidizing media in step (f) thereof are sufficient to effect a conversion of about 70 percent of the total Fe in said partially ammoniated material to $Fe^{+++}$.

5. The process of claim 1 wherein the substantial magnetic flux utilized in step (j) thereof ranges from about 1000 gauss to about 10,000 gauss.

6. The process of claim 2 wherein said period of time ranges from about 2 hours to about 24 hours.

7. The process of claim 3 wherein said second reactor means is maintained at a pressure ranging from about 10 psig to about 100 psig.

8. The process of claim 1 wherein the period of time in step (h) thereof ranges from about 0.5 hour to about 24 hours, wherein said second reactor means is maintained, during at least a substantial portion of the operation of step (f) thereof, at a pressure ranging from about atmospheric to about 100 psig, wherein said time and said quantities of oxidizing media in step (f) thereof are sufficient to effect a conversion of about 70 percent of the total Fe in said partially ammoniated material to $Fe^{+++}$, and wherein the substantial magnetic flux utilized in step (j) thereof ranges from about 1000 gauss to about 10,000 gauss.

9. The process of claim 8 wherein said period of time ranges from about 2 hour to about 24 hours and wherein said second reactor means is maintained at a pressure ranging from about 10 psig to about 100 psig.

10. The process of claim 5 wherein said substantial magnetic flux ranges from about 1000 gauss to about 2000 gauss.

11. The process of claim 8 wherein said substantial magnetic flux ranges from about 1000 gauss to about 2000 gauss.

12. The process of claim 1 wherein said liquid portion in step (k) thereof contains less than about 0.1 percent, by weight, and said solids containing portion in step (1) thereof contains greater than about 99.9 percent, by weight, of the iron originally contained in said feedstock.

13. The process of claims 2, 3, 4, 5, 6, 7, 8, 9, 10, or 11 wherein said liquid portion contains less than about 0.1 percent, by weight, and said solids containing portion contains greater than about 99.9 percent, by weight, of the iron originally contained in said feedstock.

14. The process of claim 1 wherein the quantity of ammoniating media introduced into said first reactor means in step (c) thereof is sufficient to raise the pH of the materials therein to about 10.

15. The process of claims 2, 3, 4, 5, 6, 7, 8, 9, 10, or 11 wherein the quantity of ammoniating media introduced into said first reactor means is sufficient to raise the pH of the materials therein to about 10.

16. The process of claim 1 wherein the temperature of the material in said first reactor means in step (d) thereof is maintained at about 80° C.

17. The process of claims 2, 3, 4, 5, 6, 7, 8, 9, 10, or 11 wherein the temperature of the material in said first reactor means is maintained at about 80° C.

* * * * *